Oct. 12, 1954

W. J. LEWIS 2,691,722

DRAGGING EQUIPMENT INDICATOR AND A NORMALLY
NONACTIVATED BATTERY THEREFOR

Filed Nov. 8, 1949

INVENTOR.
WARREN J. LEWIS
BY

INVENTOR.
WARREN J. LEWIS
BY

Oct. 12, 1954   W. J. LEWIS   2,691,722
DRAGGING EQUIPMENT INDICATOR AND A NORMALLY
NONACTIVATED BATTERY THEREFOR
Filed Nov. 8, 1949   3 Sheets-Sheet 3
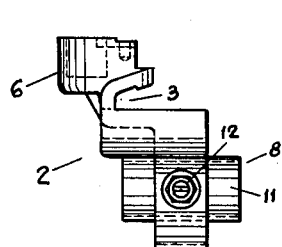
FIG. 10
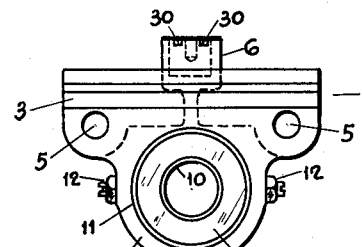
FIG. 11
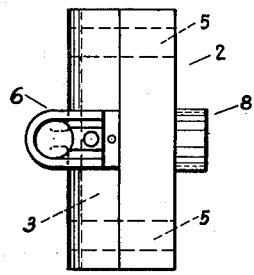
FIG. 12
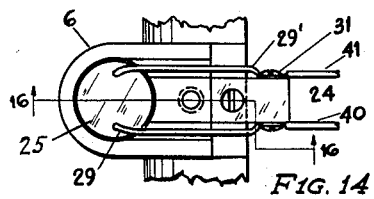
FIG. 14
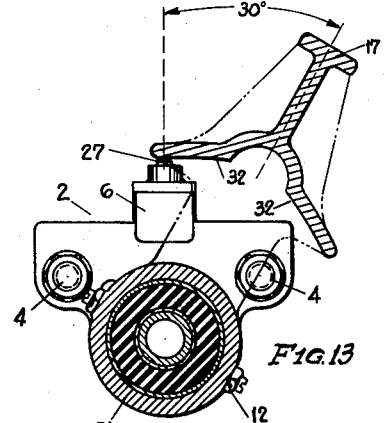
FIG. 13
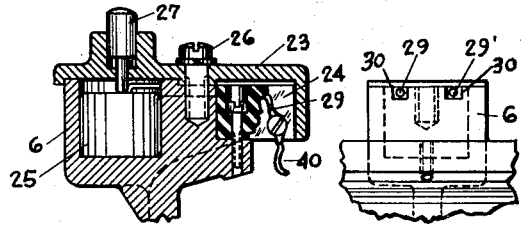
FIG. 16   FIG. 15
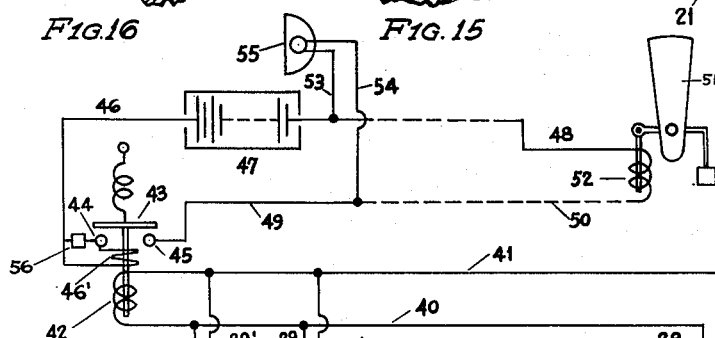
FIG. 17
FIG. 18
INVENTOR.
WARREN J. LEWIS
BY Patented Oct. 12, 1954

2,691,722

UNITED STATES PATENT OFFICE 2,691,722

DRAGGING EQUIPMENT INDICATOR AND A NORMALLY NONACTIVATED BATTERY THEREFOR

Warren J. Lewis, Mansfield, Ohio, assignor to The Ohio Brass Company, Mansfield, Ohio, a corporation of New Jersey Application November 8, 1949, Serial No. 126,134

14 Claims. (Cl. 246—246)

This invention relates to protective systems to detect dragging or hanging equipment on passing cars or other defects which may cause derailment of a car or train.

One object of this invention is to provide a device to be operated by a defective part hanging from a passing car.

Another object is to provide a device to render a normally non-activated battery active when the device is operated by a displaced part on a passing vehicle.

Another object is to provide the device with non-metallic springs for holding the operating or detector parts of the device in their normal vertical positions until operated by a passing vehicle.

Another object is to automatically return the operating or detector parts to their normal positions after the passing of the defective vehicle.

Another object of this invention is to effect the activation of a connected signal or signal system.

Another object of this invention is to provide a device with a plurality of detectors independently movable and so mounted that when one detector is operated beyond a predetermined amount by a passing vehicle the other detector or detectors will move only a portion of the amount of the operated detector.

Other objects and advantages will be evident from the description which follows and which together with the drawings cover a particular embodiment of this invention.

Dragging equipment on a moving train may cause serious damage to the train equipment, track, signal system and train personnel.

This invention when connected to a signal or signal system will cause a signal to be made manifest far enough ahead of a moving train with dragging equipment to insure ample opportunity for the train crew to observe the signal, to stop the train and take proper corrective measures.

This invention uses a battery cell which is normally non-activated, that is, the plates are normally non-submerged in the electrolyte as the electrolyte is contained in a glass ampoule which when broken releases the electrolyte into contact with the plates thus energizing the battery cell.

The battery cell which I employ will last indefinitely without deterioration until activated by the breaking of the glass ampoule.

Other systems may employ a battery which is normally on a closed circuit, the plates of the battery being at all times submerged in the electrolyte whether supplying current or not. With such a battery or even a storage battery frequent inspection and renewal of elements is necessary.

The battery cell which I use is combined with means operable by dragging equipment, for breaking the ampoule and thereby activating the battery, and the current therefrom used to set off an explosive alarm, a flare, a signal light, a block signal or a combination of these by use of suitable relays, fuse wires, etc.

After operation of my invention by dragging equipment or otherwise, it is a simple and inexpensive operation for the one inspecting the equipment to replace the spent battery cell with an inactive battery cell thus placing the equipment in condition for further normal operation.

The cell is small and relatively inexpensive and while its life is short, it is sufficiently long and the energy supplied sufficient to perform its required function.

In the drawings:

Fig. 10 is a side view of a combined rail clamp, battery holder and torsion spring.

Fig. 11 is a face view of Fig. 10.

Fig. 12 is a top view of Figs. 10 and 11.

Fig. 13 is a section taken on the line 13—13 of Fig. 1 showing the position taken by the inner support (Fig. 5) and its relation to the actuating pin for the battery when the detector has been operated from its normal position by defective equipment on a train; in the position shown the ampoule is now broken and the battery activated.

Fig. 14 is a top view (enlarged) of the battery receptacle shown in Fig. 10 but including a battery, battery leads and terminal block.

Fig. 15 is an end view of Fig. 14 showing slots for the battery leads.

Fig. 16 is a partial sectional view on line 16—16 of Fig. 14 and includes the receptacle, its cover and a battery and actuating pin, all parts shown in Fig. 1, and terminal block of Fig. 14 to which the battery leads and signal leads are attached.

Fig. 17 shows schematically my invention connected to a signal system.

Fig. 18 shows a vertical sectional view substantially full size of the battery previously referred to.

Figure 1:
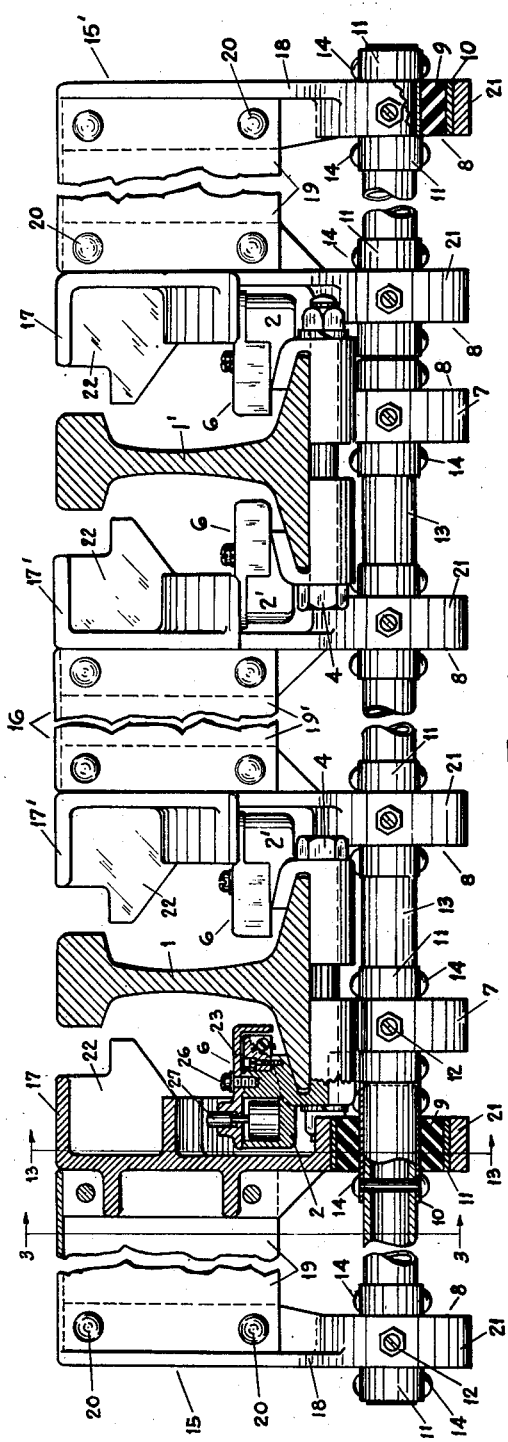
Fig. 1 is a side view in elevation of the invention in partial section with the operating parts in normal position relative to the track rails.
Figure 2:
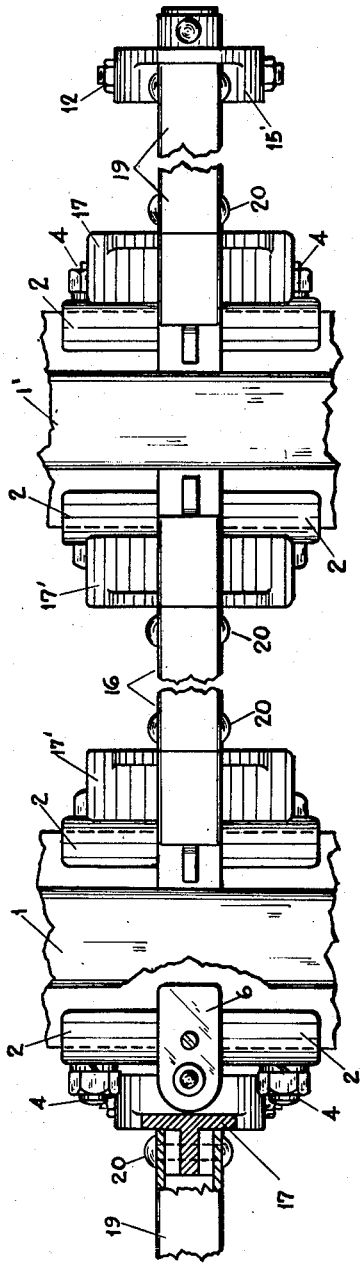
Fig. 2 is a top view in partial section of Fig. 1 shortened slightly at the left end, the construction of which it will be noted from Fig. 1 is the same as the right hand end.
Figure 3:
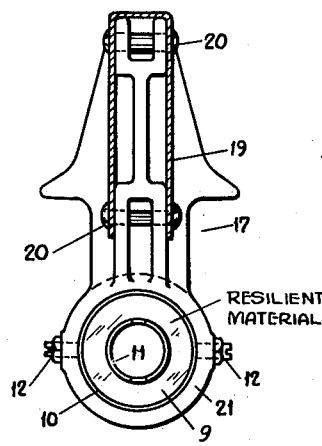
Fig. 3 is a section on the line 3—3 of Fig. 1 showing one of the detectors in section through the detector blades, and a support for same.
Figure 4:
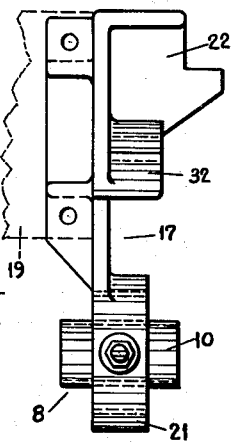
Fig. 4 is a side view of Fig. 3 with a portion of the detector blade shown dotted.
Figure 5:
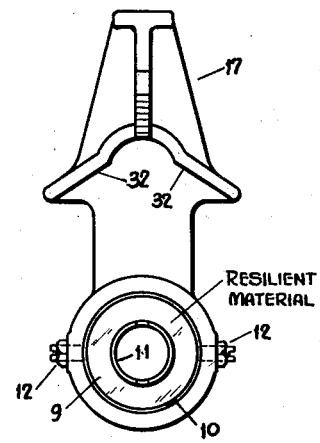
Fig. 5 is a face view of the inner support for the detector blade of Figs. 3 and 4 but an opposite face from that of Fig. 3 thereby showing the cam or applicator.
Figure 6:
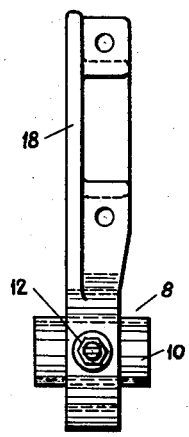
Fig. 6 is a side view of the end support for the detector blade at the outer ends of Fig. 1.
Figure 7:
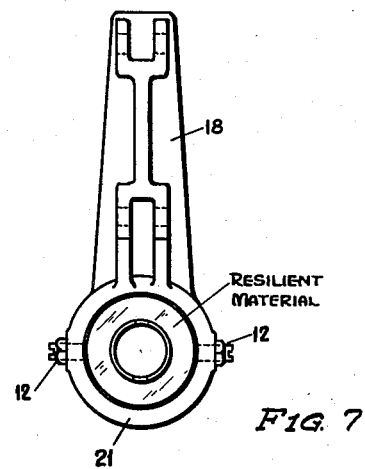
Fig. 7 is an inner face view of the end support of Fig. 6.
Figure 8:
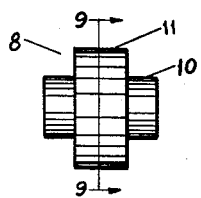
Fig. 8 is a side view of the torsion spring used in connection with the parts shown in Figs. 3, 7 and 10.
Figure 9:
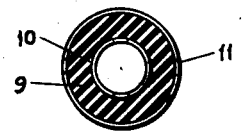
Fig. 9 is a sectional view on the line 9—9 of Fig. 8.

In Figs. 1 and 2 are shown a preferred embodiment of my invention as applied to the two opposite rails 1 and 1' of a track.

Secured to opposite sides of each rail is rail clamp comprising a pair of clamp members 2—2' (Fig. 10) each having a slot 3 to receive a portion of the rail bases and the clamp members are held in position by the bolts 4 which pass through openings 5.

Each clamp member 2 and 2' is provided with a battery holder or receptacle 6 and the clamp members 2 are provided with an integral spring holder 7 in which is mounted the torsion spring 8. The clamp members 2' do not have the spring holder 7 therefore the detector blades and supports therefore are shown supported at the two rails by the torsion springs 8 mounted in the clamp members 2. If desired however the clamping members 2' may also be equipped with torsion springs.

The torsion springs 8 each comprise an elastic resilient rubber bushing 9 with an inner projecting metal sleeve 10 and an outer metal sleeve 11 which are secured to the bushing 9 by vulcanization or otherwise and the spring is secured to the holder 7 by the screws 12 which engage the sleeve 11.

Mounted in the torsion springs 8 and supported thereby is a tubular shaft 13 extending transversely of the rails through the inner sleeves 10 of the springs 8 and which is secured to the sleeves 10 by through rivets 14.

Mounted upon the tubular shaft 13 are 3 detectors, two end detectors 15 and 15' and a central detector 16.

The end detectors each comprise an inner support 17 and an outer support 18 and a U-shaped detector blade 19 of relatively light metal connecting the two supports and secured thereto by rivets 20. Each central detector has two supports 17' and interposed blade 19'.

Each support 17, 17' and 18 is provided with a torsion spring holder 21, and each spring 8 is associated with a holder 21 in the same manner as in holder 7 and is secured to the shaft 13 in the same manner as by rivets 14.

Each inner support 17 and 17' is provided with an inwardly projecting fin 22 which is located as near the head of the rail as possible without interfering with the movement of the train wheels in order to make the protective device as continuous transversely of the track as possible and contact at least any dragging equipment.

In Fig. 1 is shown a partial section of one of the clamping members 2 through the rail receiving groove 3 and the battery holder or receptacle 6, and in Fig. 16 is shown in section an enlargement of the receptacle and cover 23 therefor and terminal block 24.

Mounted within the receptacle 6 of Fig. 16 is shown a battery 25 which in turn is shown in Fig. 18 in section and substantially full size. The cover 23 is held in place by the screw 26 and is provided with an actuating pin 27 which engages the top of the battery and crushes the glass ampoule 28 therein when the pin is depressed thus releasing the electrolyte and energizing the battery.

The battery cell shown in Fig. 18 is known as National Carbon W-155 for which no claim is herein made except as an element of the protective device as herein described as the composition of the elements and electrolyte are not known to me; the ampoule referred to herein and in the claims is however clearly shown in Fig. 18.

The leads 29—29' from the battery 25 are brought to the terminal block 24 through slots 30 (Figs. 11 and 15) and secured thereto by screws 31 (Fig. 14) and from which block extended conductors to the signal device (Fig. 17).

While provision is made for 4 batteries, one of the batteries associated with the central detector 16 may be omitted if desired as only one cell associated with the central detectors will be sufficient. I have found that each cell although small is sufficient to meet requirements.

The supports 17 and 17' are each provided with an integral applicator or cam 32 movable with the support relative to the axis of the shaft 13 and so positioned relative to the pin 27 that sufficient pressure will be applied to the battery casing through the pin to cause a breakage of the ampoule when one of the detectors has been operated a predetermined amount (see Fig. 13).

The resilient torsion springs with non-metallic rubber bushings 9 have several advantages over metal springs namely.

Rubber absorbs energy of impact better and has damping characteristics superior to metal springs; no oiling will be necessary and freezing and corrosion will have less effect on operation and exact alignment of the bearings is not necessary as the rubber units have some radial flexibility.

Other resilient materials may be used in place of rubber such as neoprene a common article of commerce which has many of the characteristics of rubber, also some of the plastics such as the silicones and other rubber-like materials, etc., may be used.

The resilient springs 8 will return the detectors to their normal up-right position after being moved therefrom by a piece of displaced or other car equipment, and will maintain such upright position until again moved therefrom.

By harmonizing the resistance of the different bushings 9 to secure desired results as by varying their resilient properties and size different results of operation of the several detectors may be secured, as for instance, all the eight bushings 9 may be of the same resistance in which case any one of the three batteries may be activated independently of the other two when the detector controlling that one battery is operated by a passing car; on the other hand if desired to operate say all three detectors in close relationship, then the hinges controlling the detectors relative to the shaft will be made more resistant to yielding than the hinges controlling the rotation of the shaft 13 relative to the rails and this may be carried to a degree where the detector hinges are substantially non-yielding or the detector hinges are pinned to the shaft in which case the detectors will operate in exact unison and to the same degree as the detector operated by a passing car, but the shaft hinges being resilient, the detectors would be returned to their normal positions when released.

Other operations may be effected by varying the resistance of the resilient bushings 9 relative to each other and while in Fig. 13 the angle of movement of the applicator or cam 32 which forms a part of the supports 17 and 17' is shown as 30° in order to effect activation of the battery, this angle of movement may be made anything desired, as for example 10° or more than 30° from the normal position.

The detectors are arranged to operate in either direction parallel to the track.

Assuming the resilient hinges are all alike and there are three battery cells in the several receptacles (Fig. 17), then if the detector 15 is operated through say the 30° required in our example to activate the batteries then the other detectors 15' and 16 will move only 15° and only the battery controlled by detector 15 will be activated. If however the detector 15 should be moved sufficiently far beyond the 30° then the cams of detectors 15' and 16 will be moved 30° and the associated batteries will be activated, but no harm will result except more batteries will be activated than necessary to actuate the signal.

Other operative results may be secured by varying the relative properties and size of the hinges 8, and the cams 32 on the supports 17 and 17' may be so arranged relative to the pins 27 that the battery cells will be activated at any desired minimum movement of the detectors.

As the movement of a detector under impact of defective equipment on a passing car may exceed considerably that of the minimum movement required to activate the battery, the ends of the cams 32 may be arranged so that they will not be caught on the pins 27 thereby interfering with the return of the detectors to their normal positions as for instance extending the ends of the cam 32 so as to continue to engage the pin 27 as shown in Fig. 13 until the detector returns to its normal position.

In Fig. 17 is shown a schematic arrangement of my invention connected to operate a signal system. Here are shown three battery cells which may be activated singly or together depending upon the characteristic of the several hinges as stated above.

The protective device of Fig. 17 has its parts designated the same as those in Fig. 1 and the batteries 25 are shown as connected to the conductors 40 and 41 by the battery leads 29 and 29' respectively.

It makes no difference if only one battery is activated or all three batteries are activated simultaneously since the batteries are normally open circuit until activated.

The conductors 40 and 41 are shown connected to coil 42 of a circuit closing relay having a spring held contactor 43 to engage and connect contacts 44 and 45 when the coil 42 is energized by a current from batteries 25 when one of the detectors 15, 15' or 16 is operated as described.

The contact 44 is connected to a normally active source of current supply (battery 47) by conductor 46 with a holding coil 46' in series and the battery is connected by a conductor 48 to one end of an operating coil 52 of semaphore 51 and the contact 45 is connected to the other end of coil 52 by the conductors 49—50 such that when the relay is closed the current from the battery 47 will effect operation of the semaphore.

Also shown connected to the conductors 48—49 is a signal light 55 by conductors 53 and 54.

When the signal circuit has been energized, it will remain energized until the manually operable normally open short circuiting switch 56 has been closed thus de-energizing the holding coil 46' and allowing the relay to open the signal circuit.

Also if desired the conductors 40—41 may be connected directly to a fusee or flare.

Any signal is positioned sufficiently ahead of the train to give the operators sufficient warning of dragging equipment.

When such defective equipment engages one or more of the detectors the same is operated in either of two directions depending upon the direction of travel of the train and the cam 32 on the detector or detectors will engage one or all of the pins 27 associated with the battery housings which will then be moved and pressed into engagement with the associated battery and the ampoule will be broken thus releasing the electrolyte and activating the battery or batteries.

Modifications will suggest themselves to those skilled in the art based on the herein disclosure and which modifications will not depart from the spirit and substances of my invention as now claimed.

I claim:

1. Means for electrically energizing a signal comprising a normally non-activated battery including activating means, the battery provided with means opeartively associated with a signal, an actuating means secured to a railroad track for movement relative to the track and having means to act upon the battery activating means to activate the battery when the actuating means is struck and moved relative to the track and battery by a member travelling along the track.

2. Means for electrically energizing a signal comprising a normally non-activated battery including activating means, and a relay electrically connected to the battery, the battery provided with means operatively associated with a signal, an actuating means secured to a railroad track for movement relative to the track and having means to act upon the battery activating means to activate the battery when the actuating means is struck and moved relative to the track and battery by a member travelling along the track.

3. Means for electrically energizing a signal comprising a normally non-activated battery including activating means, the battery provided with means operatively associated with a signal, an actuating means including a normally vertically disposed detector movable parallel to the track and means operatively associated with the detector to act upon the battery activating means to activate the battery when the detector is struck and moved relative to the track and battery by a member travelling along the track.

4. In combination, a signal, a normally non-activated open circuit battery including means to activate the battery and close the circuit therein, eletrical means operatively associating the battery with the signal, actuating means including support means to attach said actuating means to a railway track, the support means provided with means to receive and support the battery, and means operated by the actuating means to impinge upon the said battery and bring pressure upon the activating means to effect energization of the battery and operation of the signal.

5. The combination set forth in claim 4 characterised by the activating means comprising an ampoule of electrolyte adapted to be ruptured by the impinging means when the actuating means is operated by displaced member on a passing vehicle.

6. In combination with a railway track, a yieldable pivotally mounted detector movable in either direction parallel to the track rails and extending transversely of the rails and normally in a vertical relation to the rails and to be engaged by a displaced member on a passing car, resilient non-metallic hinge means for supporting and returning the detector to its normal vertical position after movement by the displaced member, a normally non-energized battery operatively associated with the detector and adapted to operate a signal, and means operable by movement of the detector when moved a predetermined amount by said displaced member to effect energization of the battery.

7. An operating device for a railway signal comprising, a detector, means to support the detector from a rail of a railway track, the detector adapted to be moved from a normal vertical position by a displaced part on a passing vehicle contacting therewith, a normally non-activated battery cell, a remote signal means adapted to be operated by the battery cell, and means operatively associated with the detector and with the battery cell to activate the battery when the detector is moved a predetermined amount in either direction.

8. In combination, a railway track, a detector device secured to the rails to detect parts dragging from cars travelling along the track, and a normally non-activated battery, the detector means including a pivotally mounted member engageable by a displaced part on a passing car and movable relative to the track and battery, and impinging means including a pin operatively associated with the pivotally mounted member to engage the battery and thereby cause activation of the battery when the said pivotally mounted member is struck and moved by a displaced part, whereby electrical energy will be generated for operation of a signal means.

9. In combination, a railway track and a detecting device to detect dragging equipment, the detecting device provided with means to secure it to the rails of the track and also having means comprising a receptacle to receive a battery and maintain it in fixed relation to the adjacent rail and impinging means including a pin associated with the receptacle to contact and thereby energize a battery in said receptacle, the detecting device provided also with detector means to be engaged by a displaced part on a passing vehicle, hinge means interposed between said securing means and the detector means to normally hold the detector means in predetermined position relative to the rails but to permit the detector means to pivot relative to the rails and the receptacle and contact and move the said pin when the detector means is engaged by dragging equipment.

10. The combination set forth in claim 9 characterized by the hinge means being formed with resilient non-metallic means whereby the detector means is returned to its normal position when released.

11. A device comprising, means to grip the rails of a track and provided with means to receive and support one or more non-activated batteries in fixed relation adjacent to the rails and impinging means including a pin associated with the battery-receiving means to contact and thereby energize a battery, detector means arranged at right angles to the rails to be engaged by displaced means on a passing vehicle, hinge means interposed between the grip means and the detector means whereby the detector means is normally held in a predetermined position relative to the rails and will pivot about the axis of the hinge means in a direction parallel to the rails when the detector means is engaged by said displaced means, and means on the detector means to cooperate with and engage the pin to activate one or more batteries when and if contained in said battery support means and if the detector is operated from its predetermined position.

12. A device comprising, a pair of spaced clamping means to be secured to the rails of a track, a shaft extending transversely of the track, hinge means to support the shaft from the clamping means and to yieldingly hold the shaft in a predetermined position relative to the rails, detector means transversely disposed between the outside of the rails of the track whereby the detector means may be engaged and moved by a hanging part on a passing vehicle, hinge means to yieldingly secure the detector means to the shaft and in a predetermined position relative to the rails whereby the shaft will be rotated when the detector means is rotated on the axis of the shaft, holding means for a normally non-activated battery supported by the clamping means adjacent to the rails, and impinging means including a pin associated with the battery holding means to contact and thereby activate a battery held by said battery holding means when the detector means is activated a predetermined amount from said predetermined position relative to the rails.

13. A device comprising a pair of spaced clamping means adapted to be secured to the rails of a track, a shaft extending transversely of the track, hinge means to support the shaft from the clamping means and to yieldingly hold the shaft in a predetermined position relative to the rails, detector means transversely disposed between and outside of the rails of the track whereby the detector means may be engaged and moved by a hanging part on a passing vehicle, hinge means securing the detector means to the shaft in a predetermined position relative to the rails whereby the shaft will be rotated when the detector means is rotated on the axis of the shaft, battery holding means comprising a receptacle supported by the clamping means and means on the detector means cooperating with impinging means including a pin associated with the battery holding means to contact and thereby energize a plurality of batteries when the detector means is actuated a predetermined amount from said predetermined position relative to the rails.

14. A device for operating a signal comprising, a normally inactive battery, means to support the battery in fixed relation to a track, independent pivotal dragging equipment detector means positioned pivotally on each side of each rail in transverse vertical relation to the rails to be engaged by defective equipment on a passing train, clamping means secured to the rails to support the detector means and the battery support means and to normally maintain the pivotal detector means in said vertical position, hinged means including non-metallic resilient means interposed between the detector means and the clamping means, an actuator associated with each detector means and movable with the detector means, an impact pin associated with each battery support means to be engaged by an actuator when the associated detector means is operated by a passing displaced part on a car whereby the impact pin is depressed into engagement with the associated battery there by effecting activation of the battery and generation of electrical energy for signal operation.

References Cited in the file of this patent

UNITED STATES PATENTS

| Number | Name | Date |
|---|---|---|
| 1,218,847 | Firey | Mar. 13, 1917 |
| 2,007,800 | Graf | July 9, 1935 |
| 2,095,616 | Post | Oct. 12, 1937 |
| 2,251,453 | Jackson | Aug. 5, 1941 |
| 2,408,553 | Gieskieng et al. | Oct. 1, 1946 |
| 2,433,024 | Burgess | Dec. 23, 1947 |
| 2,435,365 | Post | Feb. 3, 1948 |

FOREIGN PATENTS

| Number | Country | Date |
|---|---|---|
| 446,612 | Germany | July 8, 1927 |
| 285,778 | Italy | May 22, 1931 |
| 48,908 | Netherlands | July 15, 1940 |